United States Patent [19]
McEuen

[11] 3,975,674
[45] Aug. 17, 1976

[54] GEOTHERMAL EXPLORATION METHOD UTILIZING ELECTRICAL RESISTIVITY AND SEISMIC VELOCITY

[76] Inventor: Robert B. McEuen, 5202 College Gardens Court, San Diego, Calif. 92115

[22] Filed: Sept. 29, 1972

[21] Appl. No.: 293,480

[52] U.S. Cl. .................................... 324/1; 324/6; 340/15.5 TA
[51] Int. Cl.² .................... G01V 3/00; G01V 11/00
[58] Field of Search ................ 324/1, 5, 6, 10, 9; 340/15.5 R, 15.5 CC, 15.5 TA

[56] References Cited
UNITED STATES PATENTS

| | | | |
|---|---|---|---|
| 2,054,067 | 9/1936 | Blau et al. | 324/1 X |
| 2,713,147 | 7/1955 | Stripling | 324/1 |
| 3,166,708 | 1/1965 | Millican | 324/1 |
| 3,180,141 | 4/1965 | Alger | 324/1 X |
| 3,621,380 | 11/1971 | Barlow | 324/1 |

*Primary Examiner*—Gerard R. Strecker

[57] ABSTRACT

A method of geothermal exploration in which the arrival times of reflected seismic waves and voltage differences caused by subsurface current flow are detected and processed to provide useful estimates of subsurface porosity, pore-fluid resistivity and equivalent salinity as functions of position.

9 Claims, 12 Drawing Figures

GEOTHERMAL EXPLORATION METHOD UTILIZING ELECTRICAL RESISTIVITY AND SEISMIC VELOCITY

DESCRIPTION OF THE INVENTION

The invention relates to a geophysical method for determining remotely the resistivity and equivalent salinity of fluids saturating the subsurface pore space and in addition determining the quantity of pore space present. More particularly, the invention relates to the processing in combination of seismic velocity values and electrical resistivity values these values being measured remotely. The unique processing of these remotely measured velocity and resistivity values which forms the substance of the invention provides realistic estimates of the resistivity and equivalent salinity of the fluid saturating the pore space and the percentage of pore space as functions of distance from the remote position of measurement.

The method described finds wide application in the study of groundwater and is particularly useful for delineating geothermal reservoirs. The salinity of groundwater within a geothermal province changes laterally only gradually, therefore localized changes in groundwater resistivity detectable by means of this invention are caused principally by changes in reservoir temperature.

The functioning of the invention is postulated on remote detection of the distance to interfaces separating zones of differing acoustic impedance, the remote determination of the seismic velocities within these zones and the remote determination of the electrical resistivity of these zones.

The reflection seismic method of geophysical prospecting remotely determines the distance to interfaces separating zones having differing acoustic impedance, where the acoustic impedance, $dV$, is the product of the density, $d$, and the seismic wave velocity, $V$. This is accomplished by measuring the distribution in time, $t$, and space, $x$, of the seismic energy reflected from the interfaces separating zones having differing acoustic impedance.

The electrical resistivity method of prospecting in which an expanding electrode array is employed is able to remotely determine resistivity as a function of distance from the point of observation. This is accomplished by measuring the distribution in space, $x$, of the voltage differences, $\Delta v$, caused by the remote injection of electrical current, $I$. Although this invention is not limited to the utilization of this manner of obtaining resistivity as a function of distance from the remote point of observation, its functioning is most easily explained by making reference to an expanding electrode array technique.

It is therefore an object of this invention to detect and process seismic wave arrival times and voltage differences in such a way as to obtain an estimate of the resistivity and equivalent salinity of the fluid saturating the ground at a position remote from the point of measurement. A still further object is to provide an estimate of the available pore spaces at points remote from the point of observation. These and further objects of this invention will become apparent or be described as the description thereof herein proceeds and reference is made to the accompanying drawings in which.

in which $\Delta v$ is the potential difference between electrodes located at distances $x_n$ and $x_{n+1}$ as measured from the surface pole. $\rho_a$ is presented in the dimensionless form $\rho_a/\rho_l$ where $\rho_l$ is the value of $\rho_a$ at small $x$.

Figure 3:
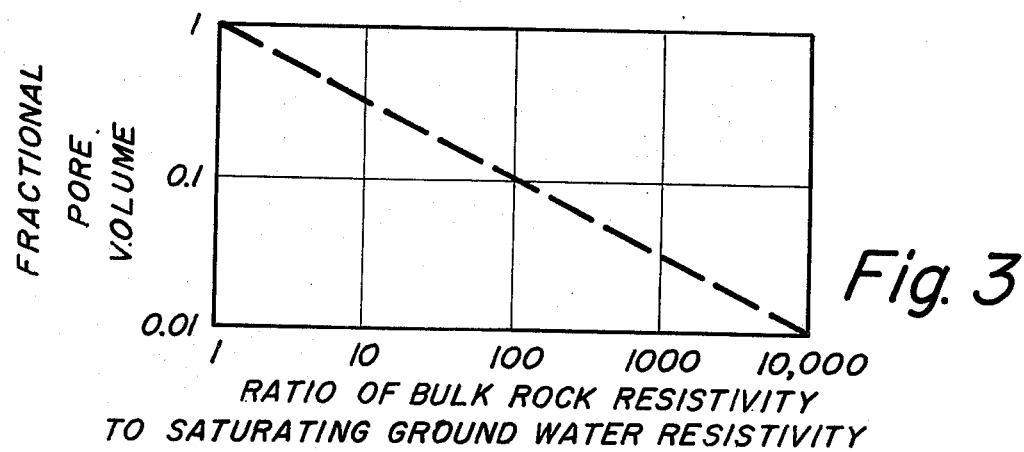

FIG. 3 shows an accepted empirical relation between porosity and the ratio, $\rho_r/\rho_w$, of the bulk rock resistivity to the saturating groundwater resistivity. This ratio is called the Formation Factor.

Figure 4:
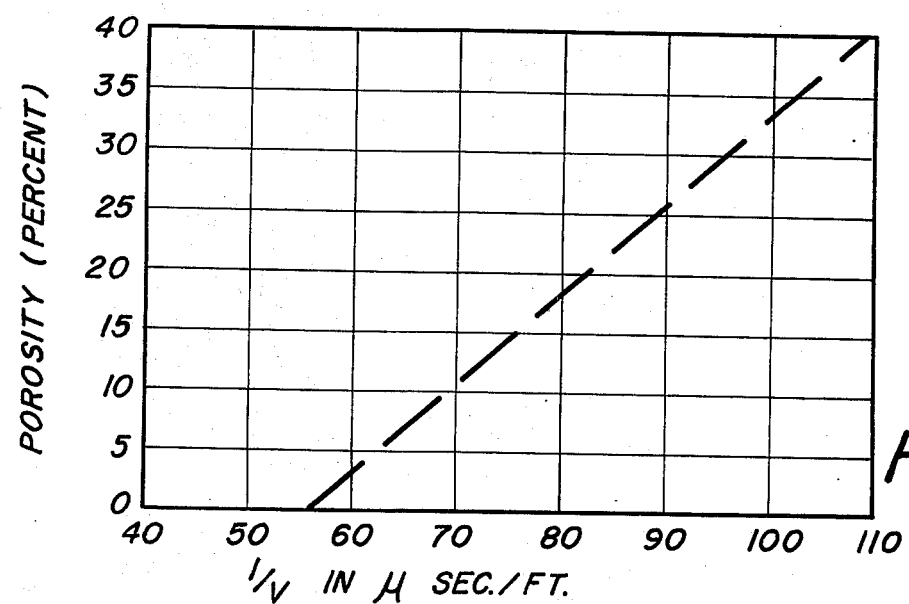

FIG. 4 shows an accepted empirical relation between seismic velocity and rock porosity.

Figure 5:
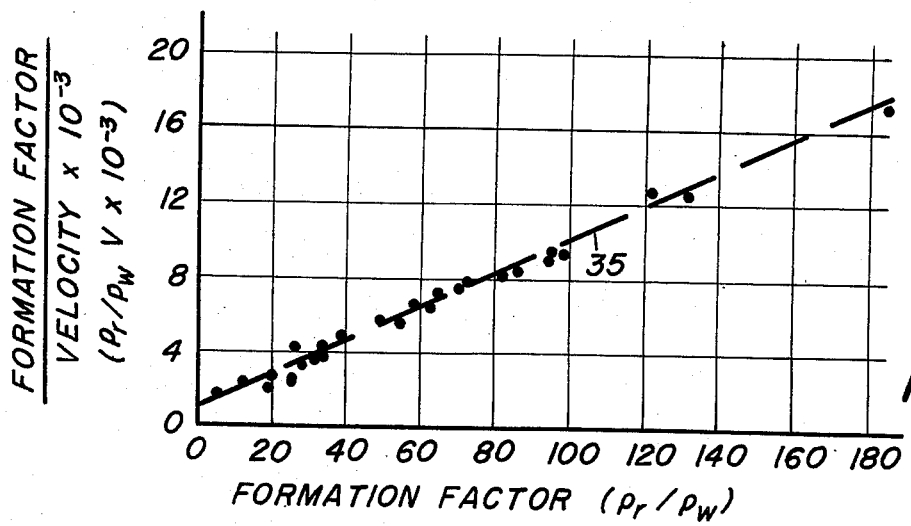

FIG. 5 shows an accepted empirical relation between the ratio, $\rho_r/\rho_w$, of the bulk rock resistivity to the saturating groundwater resistivity and the seismic wave velocity.

Figure 6:
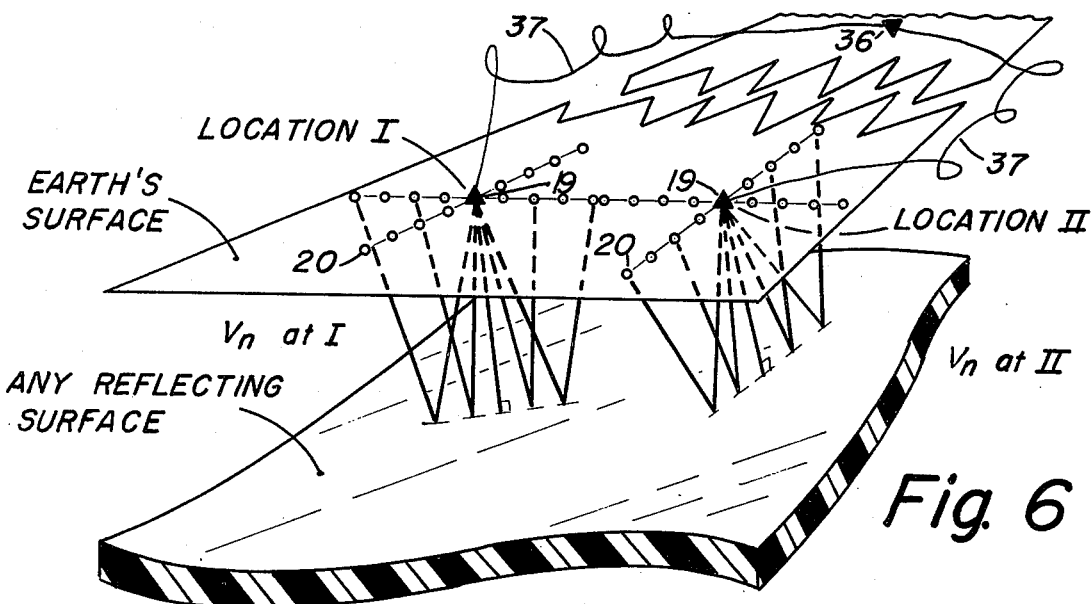

FIG. 6 shows schematically the combined electrical current and seismic wave source required to practice this invention. Also shown is the disposition of the combined electrical voltage and seismic wave receivers used in the practice of this invention.

Figure 7:
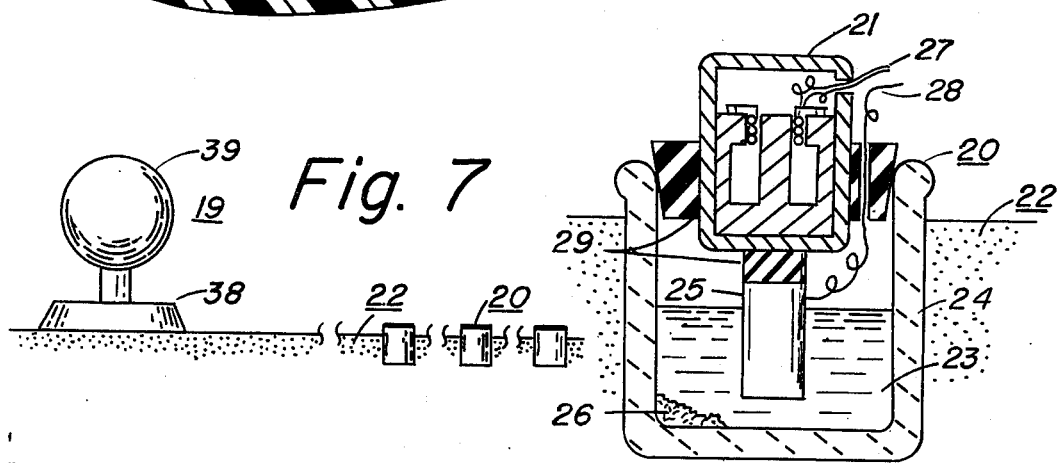

FIG. 7 shows in greater detail the nature of the combined source and combined receivers. A sectional view of a combined receiver is also shown.

Figure 8:
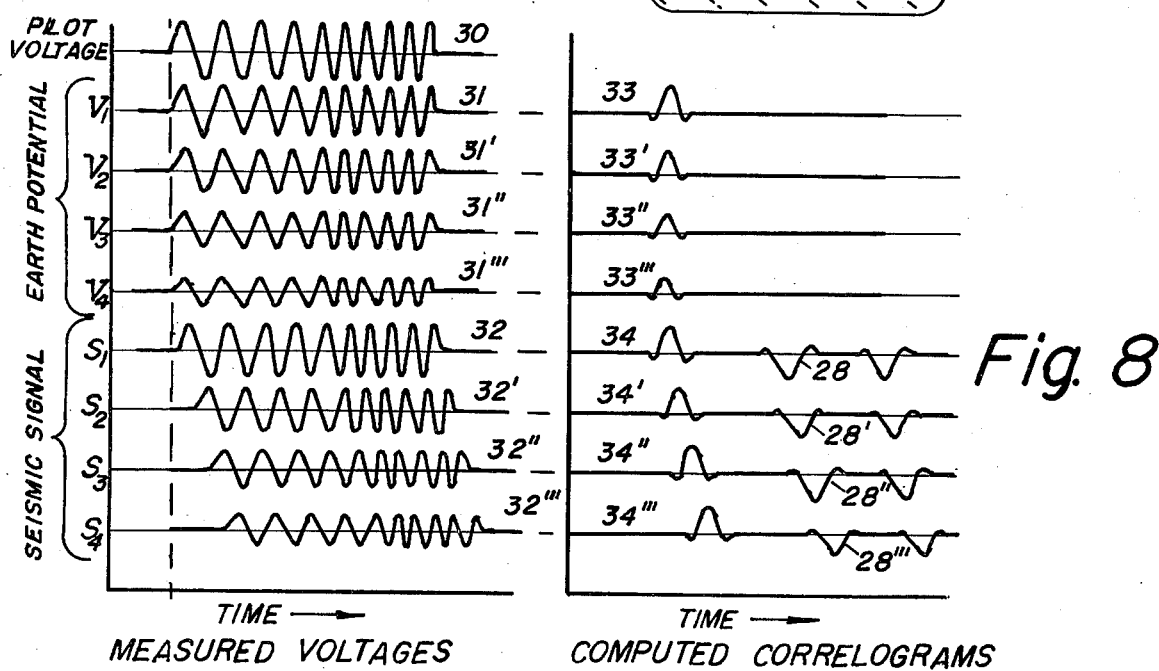

FIG. 8 shows the waveform generated at the source and the waveforms at the receiver locations. Also shown are correlograms obtained from these waveforms.

Figure 9:
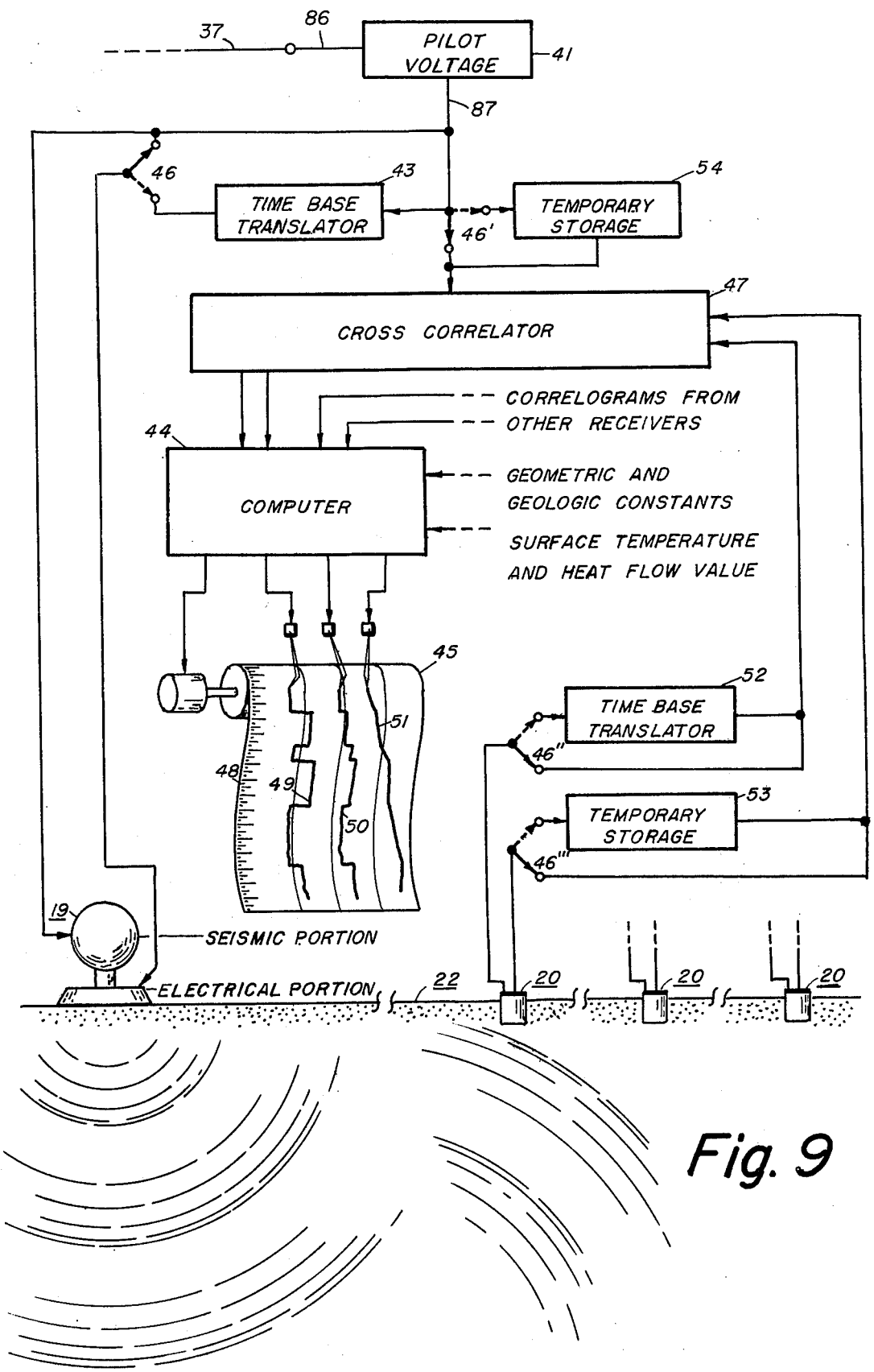

FIG. 9 illustrates the overall functioning of the proposed geothermal exploration method utilizing electrical resistivity and seismic velocity.

Figure 10:
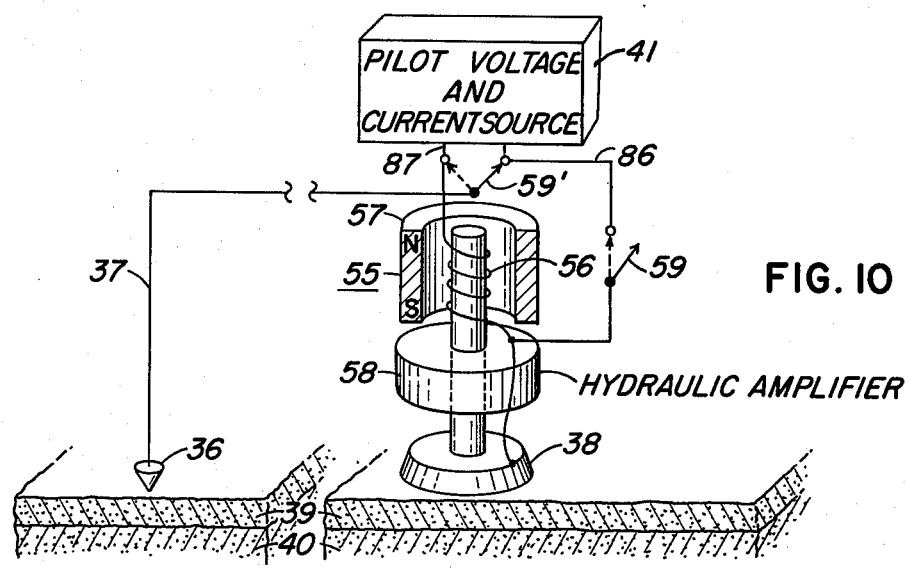

FIG. 10 shows the structure and circuitry of a possible combined electrical current and seismic wave source.

Figure 11:
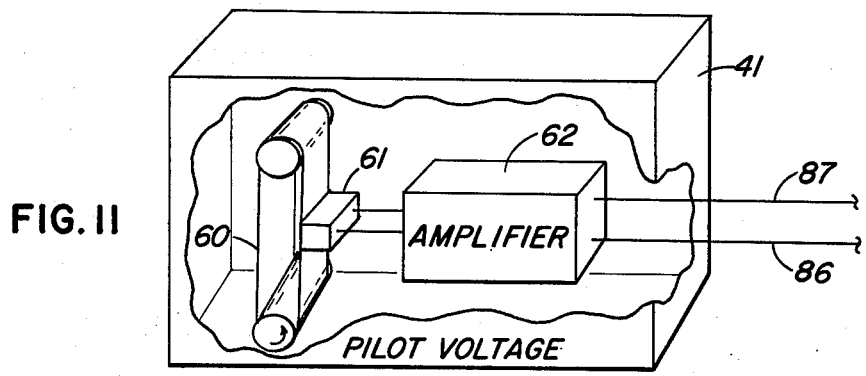

FIG. 11 depicts a possible pilot voltage source.

Figure 12:
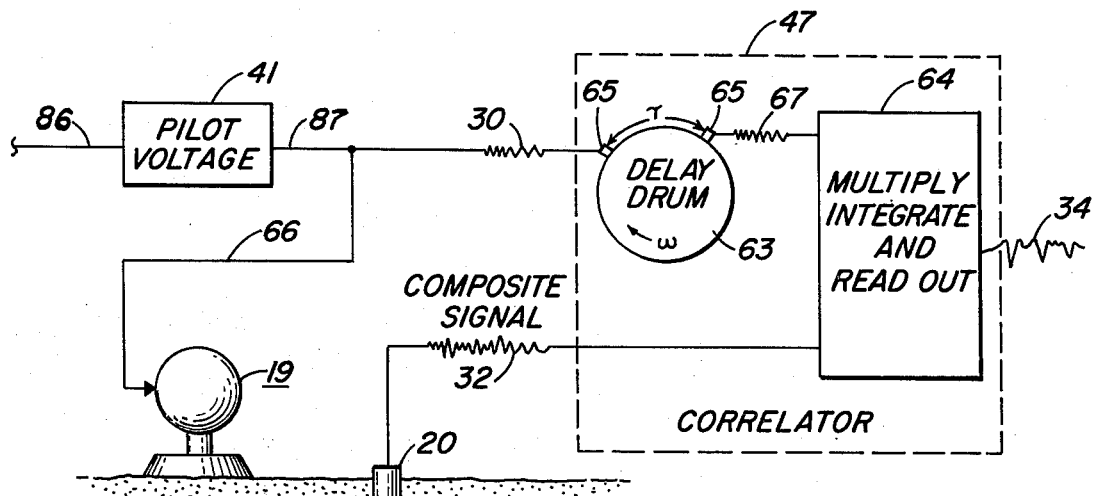

FIG. 12 indicates the preferred method of signal processing.

Figure 1:
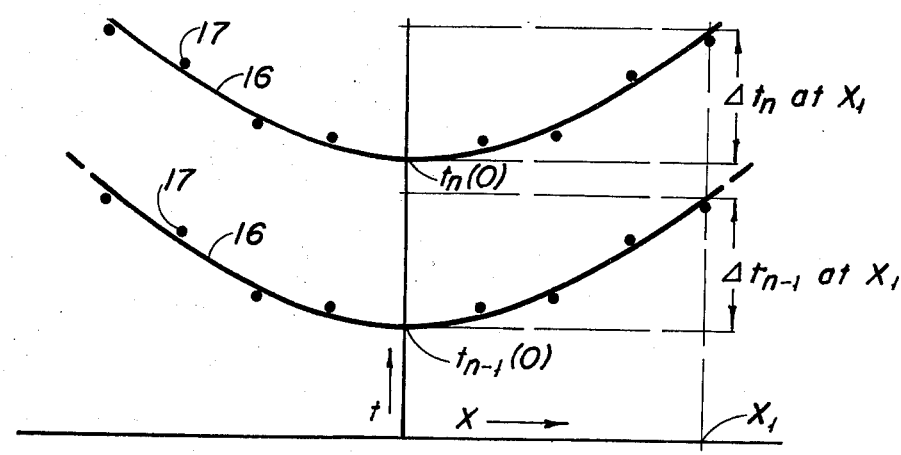
FIG. 1 shows the arrival time curves ($t$ vs. $x$) for reflected seismic energy arriving from interfaces separating zones of differing acoustic impedance. Said curves are plotted as a function of distance, $x$, along the ground surface measured from the point of origin of the seismic wave.
Figure 1:
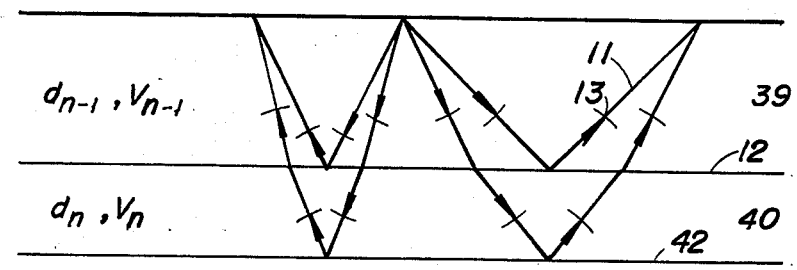
Figure 2:
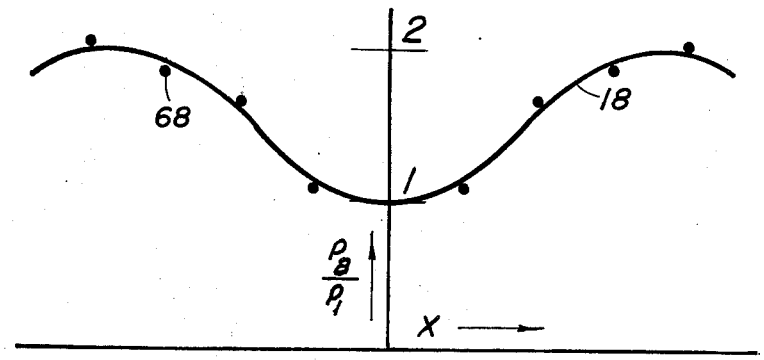
FIG. 2 shows apparent resistivity, $\rho_a$, variation as a function of distance, $x$, measured from the source of injected current, $I$. For the pole-dipole configuration used in this description the apparent resistivity, $\rho_a$, is defined by the equation $$\rho_a = \frac{2\pi\Delta v}{I(\frac{1}{x_n} - \frac{1}{x_{n+1}})}$$
Figure 2:
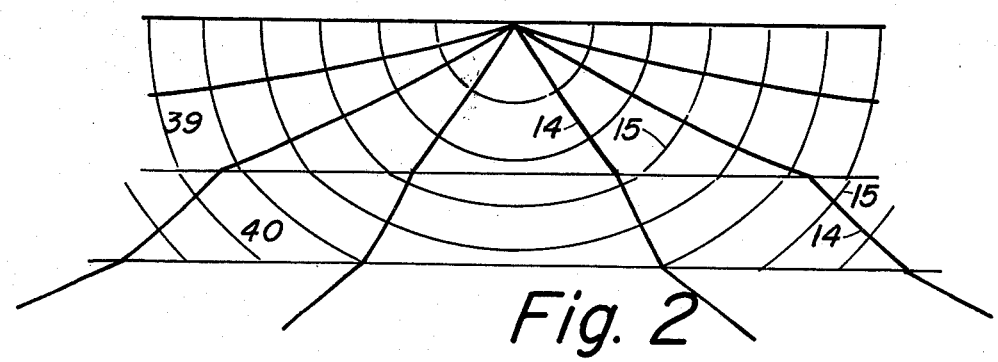

Concerning the theory of operation of the invention, reference is made to FIGS. 1 and 2 which depict the two events that are occurring simultaneously at the source. FIG. 1 shows seismic ray paths 11 being reflected from interfaces 12 and 42 between layers having differing acoustic impedance. The rays are normal to the expanding wave fronts 13. FIG. 2 shows current flow lines 14 and their refraction on entering layers of differing bulk rock resistivities. This refraction influences the geometry of the electrical potential lines 15 which are normal to the current lines. The functioning of the invention can be made clear by indicating how the method of this invention determines the resistivity of the fluid saturating an arbitrary layer such as layer 40 depicted in FIGS. 1 and 2. In addition it will become clear how the porosity of layer 40 is estimated. The upper portion of FIG. 1 shows travel time curves 16 for the seismic arrivals reflected from the interfaces 12 and 42. These travel times curves represent the numerical solution obtained by numerically fitting the detected arrival times 17 with the equation $$V_n^2 = \frac{x^2}{2[t_n(0) - t_{n-1}(0)]} \left[ \frac{1}{\Delta t_n} - \frac{1}{\Delta t_{n-1}} \right] \quad (1)$$

in which $V_n$ is the seismic wave velocity in layer 40, $t_n(0)$ is the arrival time at $x = 0$ of the reflection from interface 42 and $t_{n-1}(0)$ is the arrival time at $x = 0$ of the reflection from interface 12. $\Delta t_n$ and $\Delta t_{n-1}$ are the incremental increases in time of arrival of the reflections from interface 12 and interface 42 observed a distance $x$ from the point $x = 0$. Slightly more complex equations can be derived for the case in which the reflectors do not parallel the upper surface. The important observation is that by detecting the arrival times of reflected events at the surface, an estimate of the seismic wave velocity in the interval between points of reflection can be made for any and all layers.

The upper portion of FIG. 2 shows a theoretical curve 18 for apparent resistivity, $\rho_a$, divided by the resistivity of the first layer, $\rho_1$, versus distance $x$. The value of $x$ at which $\rho_a/\rho_l$ values are plotted is given by the quantity $(x_n + x_{n+1})/4$ where $x_{n+1} - x_n$ is the constant distance between adjacent potential measuring electrodes. This is the type of curve one obtains for an electrode configuration (pole-dipole) such as that shown in FIG. 6. For this configuration $$\rho_a = \frac{2\pi \Delta v}{I \left( \frac{1}{x_n} - \frac{1}{x_{n+1}} \right)} \quad (2)$$

The change in $\rho_a/\rho_l$ as a function of $x$ is brought about by the fact that the more distant electrodes are being affected by current which has passed through deeper more resistive layers. If all layers had the same resistivity the curve would be the straight line defined by $\rho_a/\rho_l = 1$. For the case shown the resistivity of the second layer is twice that of the uppermost layer as indicated by the plateau in the $\rho_a/\rho_l$ curve at a value of 2 for intermediate values of $x$. An equation can be written for the curve $\rho_a/\rho_l$ versus $x$ for the $n$-layer case; however, for the purpose of demonstrating the utility of this invention, it is sufficient to state that values of the resistivity for the individual layers can be determined uniquely from the theoretical solution which best fits detected voltage differences. A preferred method of processing is to use the seismic reflection input to determine the location of the major interfaces separating zones having markedly different seismic velocities. Having thus determined the thicknesses of the major zones, the preferred method uses these thicknesses in a theoretical resistivity model and adjusts the resistivities within these seismically determined zones until a "best" fit, in the least squares sense, is obtained between the resistivity model and the measured voltage differences.

It should be clear that the success of the invention is contingent upon obtaining accurate values of seismic reflection arrival times and accurate values of the voltages which result from the injection of current. In addition the amplitude and sign of the reflected seismic wave relative to the incident seismic wave is of interest for it to provide a check on the distribution of velocity as a function of distance. The ratio of the amplitude of the reflected energy to the incident must at normal incidence obey the relation $$\frac{A_r}{A_i} = \frac{d_n V_n - d_{n-1} V_{n-1}}{d_n V_n + d_{n-1} V_{n-1}} \quad (3)$$

where $d_{n-1}V_{n-1}$ is the acoustic impedance on the side of the boundary nearest the source and $d_n V_n$ is the acoustic impedance on the far side of the boundary. In practice density changes are no more than about ±10 percent while seismic velocity may change by ±50 percent. The $A_r/A_i$ ratio can therefore be related to change in seismic velocity.

In order to accurately obtain these quantities the field arrangement shown in FIG. 6 is employed and the data recorded on magnetic tape in such a way that the tape's output will appear as shown in FIG. 8. In FIG. 6, 20 represents the combined seismic wave and electric potential receivers and 36 the distant electrode needed to complete the current injection circuit. Wires 37 connect the distant electrode 36 to the current source portion of the combined seismic wave and electrical current source 19. The current source portion is also connected to the electric pole 38 which is in the form of a base plate which is placed under vibrator 39 as shown in FIG. 7. In FIGS. 6 and 7, 19 is an acoustic vibrator similar to that used in conventional seismic prospecting with the exception that this vibrator not only provides the seismic input but also acts as a source of electrical current and 20 represents the combined seismic wave and earth voltage receivers.

A conventional seismic vibrator consists of a pilot-voltage actuated electromagnetic driver unit which is activated by electrical current derived from a pilot voltage that may be obtained from magnetic tape. The movement of the electromagnetic driver unit operates a hydraulic pilot valve. The hydraulic pilot valve's function is to control oil flow which actuates a hydraulic power valve which in turn modulates and controls flow to the main hydraulic actuator of the vibrator. A motor driven hydraulic pump is usually required to supply basic hydraulic power. A typical hydraulic system might consist of a 500 hp motor driving a pump which delivers 200 gal/min at 3,000 psi. A hydraulic vibrator of the type described produces an acoustic output which can be essentially identical in form to the form of the pilot voltage.

Other types of vibrators can be used to practice this invention. For example an electromagnetic vibrator or an electroviscous vibrator as exemplified by U.S. patent to Harold K. Chaney and Halvor T. Strandrud, U.S. Pat. No. 3,416,549 may be used. Both these vibrator types require a pilot voltage and produce an acoustic output that is essentially identical in form to the form of the pilot voltage. FIG. 10 shows schematically the preferred workings of novel combined seismic wave and electrical current source 19. Pilot voltage and current source 41 provides electrical current via wires 86 and 87 to the electromagnetic driver unit 55 consisting of moving coil 56 and magnetic field producing means 57. Moving coil 56 produces a force which if necessary can be hydraulically amplified by conventional hydraulic amplifier 58 and applied to base plate 38. This force is proportional to the magnitude of the current flowing through the electromagnetic driver and has a direction dependent upon the direction of this current flow.

After passing through the electromagnetic driver unit 55 the current returns to pilot voltage and current source 41 by passing through base plate 38, through earth layers 39, 40 etc., through distant electrode 36 and through wire 37. One skilled in the art of geophysical prospecting will recognize that the combined source 19 just described when developed as depicted in FIG. 6 can serve as a point source of identical electrical current and seismic energy.

The selection of the vibrator type is dependent on the allowable level of distortion, the desired magnitude of force and range of frequency required. In the case of hydraulic and electroviscous vibrators the pilot voltage or current produces a force which is then amplified by hydraulic means, 58.

The operation of the combined source has been described in terms of a series circuit. Simultaneous excitation can also be accomplished by operating the electromagnetic driver in parallel with the current source. This can be brought about as shown in FIG. 10 by changing switches 59 and 59′. Parallel circuit operation is preferred when time base translation of the injected current is desired.

FIG. 7 shows in cross section a preferred cylindrically shaped receiver. This receiver consists of a moving coil seismometer 21 affixed atop a ceramic electrode similar to those presently used in electrical prospecting. The receiver 20 is implanted in moist ground 22 in such a way that the conductive salt solution 23 can make contact with the ground through the porous ceramic container 24. The metal electrode 25 is in contact with salt solution 23 and forms a reversible electrode with respect to this salt solution. Excess salt 26 is often provided to solution 23 in order to assure electrical stability. The electrical output from the seismometer portion 21 is provided by means of wires 27. The earth voltage can be assumed to be that of metal electrode 25 and is monitored by means of wire 28. Insulators 29 provide the necessary electrical isolation between the seismometer portion of the receiver and the earth potential monitoring portion.

At the combined seismic wave and electrical current source 19 a pilot voltage derived from magnetic tape is used to produce the seismic and electrical pulse and is identical in form and proportional to the transmitted seismic pulse and to the transmitted electrical current pulse. This pilot voltage is indicated by the uppermost trace 30 in FIG. 8. As will be noted, the voltage time histories 31 associated with the injected current all begin inphase with (at the same time as) the pilot voltage. Cross-correlation of the pilot signal with the measured voltages provides a realistic estimate of the amplitude of the voltage due solely to the injected electrical current. In some instances a delay will be experienced in the build up of the voltage associated with the injection of current. The magnitude of this delay can also be determined through cross-correlation of the pilot signal with the received voltage wave forms. All earth potential time histories shown in FIG. 8 are measured at various values of $x$ and are values relative to an arbitrary receiver such as 20. The value of the reference potential has no effect on the solution of equation (2). Because reflected seismic energy overlaps, the time histories 32 of the reflected energy form complicated interference patterns. Prior art teaches the use of cross-correlation to determine the amplitude and time of arrival (phase) of reflected seismic pulses. This art does not anticipate, however, the combined processing of electrical and seismic data. The right hand portion of FIG. 8 shows schematically the nature of the correlograms 33 and 34 obtained from this cross-correlation. It will be shown by discussion of FIG. 12 that correlograms 33 provide a best estimate of the time of occurrence, amplitude and sign of the needed electrical voltages and that correlograms 34 provide similar estimates for reflected seismic arrivals 28. It will also become clear that these values can be used to automatically determine the seismic velocity and the bulk rock resistivity within any interval bounded by zones having markedly different acoustic impedance and electrical bulk rock resistivity. The term bulk rock resistivity is used to distinguish same from the resistivity of the groundwater which saturates the interval in question.

Although the preferred method of executing the intent of this invention is accomplished through simultaneous and coincident application of seismic and electrical current pulses of identical time domain waveform, in some applications it is preferable to employ seismic and electrical current pulses of differing frequency content. When simultaneous pulses of identical waveform are used, the frequency range contained within the pulses extends from approximately 1 to 1,000 Hertz. Pulses of differing frequency content are most often required when the resistivity of the groundwater which saturates the pores is low and the porosity is high. For such an environment, high frequency electrical current tends to be largely confined to the near surface. This effect is often called the "skin effect". If a sufficiently low frequency is used this effect can, for all practical purposes, be eliminated. In the practice of this invention the necessary low frequency current pulse is generated by using as a pilot voltage for this current pulse a recording of the pilot voltage used to generate the seismic pulse. This recording is played at some fraction of the speed at which it was recorded by time base translator 43 (see FIG. 9). Usually a time base expansion of 32 is sufficient to eliminate problems associated with the skin effect. This expansion causes the 1 to 1,000 Hertz pilot voltage to undergo a downward frequency translation to 0.03125 to 31.25 Hertz. The data obtained with the low frequency current pulse is recorded on magnetic tape and is translated back to the 1 to 1,000 Hertz range for analysis by time base translator 52 (see FIG. 9). For the case described this translation is accomplished by playing back these data at a rate which is 32 times that at which they were recorded. After this upward frequency translation the seismic and electrical potential data appear as in the left hand portion of FIG. 8 and the data analysis proceeds as previously described.

It will now be demonstrated how the method of this invention determines the resistivity of the groundwater from the values of bulk rock resistivity, $\rho_r$, and the seismic wave velocity, V. FIG. 5 shows a plot of data which was obtained in the following way. First the bulk rock resistivity, $\rho_r$, was measured. Then the resistivity of the groundwater saturating the rock, $\rho_w$, was measured. Next the ratio of these two quantities, $\rho_r/\rho_w$, was calculated. This ratio, often called the Formation Factor, is the abscissa of the points plotted in FIG. 5. The velocity, V, of seismic waves was also measured for each sample. The parameter $\rho_r/\rho_w V$ was calculated and used as the ordinate for the values plotted in FIG. 5. It will be noted that a straight line 35 fits these measured data when they are plotted in this manner. This means that a suitable empirical equation relating these variables is of the form $$\frac{\rho_r}{\rho_w V} = b \frac{\rho_r}{\rho_w} + a . \quad (4)$$

For the data plotted in FIG. 5 the constants $a$ and $b$ take on the values $1.1 \times 10^{-3}$ and $9.1 \times 10^{-5}$ respectively.

It is the intent of the method of this invention to determine the resistivity of the groundwater, $\rho_w$, which saturates the zone for which the seismic velocity and bulk rock resistivity have been automatically calculated. Equation (4) can be rewritten as $$\rho_w = \frac{\rho_r}{a} \left( \frac{1}{V} - b \right) . \quad (5)$$

Equation (5) can be used to determine $\rho_w$ once the bulk rock resistivity and seismic velocity are known. $\rho_w$ in ohm-meters can also be converted automatically to equivalent salinity, C, expressed in parts per million by means of the relation $$C = \frac{10M}{\beta \rho_w (u_{2_{1s}} - u_{c_{1s}})(1 + \alpha(T-18))} \quad (6)$$

in which $M$ is the molecular weight of the dissociated salt, $\beta$ is its degree of dissociation, $u_{9_{1s}}$ and $u_{c_{1s}}$ are the ionic mobilities at 18°C for the anions and cations respectively, $\alpha$ is a coefficient which takes on the value 0.025 for most electrolytes, and $T$ is temperature in degrees Centigrade. For the range of concentration anticipated $\beta$ is equal to 1, representing complete dissociation.

The validity of the method of this invention can be established further by a theoretical derivation of equation (5). This derivation is accomplished by combining Archie's Law $$\rho_r = k\rho_w \phi^{-m} \quad (7)$$

as originally proposed by G. E. Archie in 1942 and Wyllie's time-average equation $$\phi = \frac{1/V - 1/V_{ma}}{1/V_w - 1/V_{ma}} \left( \frac{1}{c} \right) \quad (8)$$

as proposed by M. R. J. Wyllie, A. R. Gregory, and L. W. Gardner in 1956. The line which corresponds to solutions for equation (7) is shown in FIG. 3 and the line which corresponds to solutions for equation (8) is shown in FIG. 4. For a model consisting of three sets of straight tubular pores, each set of pores being at right angles to the directions of the other two sets, the constants $k$ and $m$ in Archie's Law take on the values 3 and 1 respectively. The parameter, $\phi$, is the porosity of the rock. It will be noted that this parameter occurs in both equation (8) and equation (7). In equation (8) $V_{ma}$ is the seismic wave velocity in the material which makes up the solid portion of the rock. This velocity is referred to as the "matrix velocity." The quantity $V_w$ is the seismic wave velocity in the fluid which saturates the pore space in the rock. $c$ is a correction factor which is used to compensate for under-compaction in loosely consolidated sediments. If the porosity as given by equation (8) is substituted into equation (7) we obtain for the theoretical model being discussed $$\rho_w = \frac{\rho_r}{3c(1/V_w - 1/V_{ma})} \left( \frac{1}{V} - \frac{1}{V_{ma}} \right). \quad (9)$$

This equation serves to identify the theoretical basis for the empirical constants $a$ and $b$ in equation (5). Comparing equations (5) and (9) makes it clear that $$a = 3c \left( \frac{1}{V_w} - \frac{1}{V_{ma}} \right) \quad \text{and} \quad b = \frac{1}{V_{ma}}.$$

For all but under-compacted samples the value of $c$ may be taken as equal to 1. In actual rocks the values of $k$ and $m$ in Archie's Law are known to assume values which differ from the values 3 and 1 obtained from the theoretical model. A general form for equation (9) is therefore $$\rho_w = \frac{\rho_r}{kc \left( \frac{1}{V_w} - \frac{1}{V_{ma}} \right)^m} \left( \frac{1}{V} - \frac{1}{V_{ma}} \right)^m \quad (10)$$

which can be generalized to $$\rho_w = \frac{\rho_r}{g} \left( \frac{1}{V} - b \right)^m \quad (11)$$

which contains three arbitrary constants, namely $g$, $b$, and $m$. The data of FIG. 5 suggests that for most applications of the method of this invention the simpler equation (5), obtainable from (11) by assigning $m$ the value 1, provides an adequate means for estimating the resistivity of the fluid saturating the pore space. It should be clear that since values of $V_{ma}$, $V_w$, and $c$ are known, the method of this invention in conjunction with equation (8) allows the remote determination of the porosity of an interval between zones having markedly differing acoustical impedances; for the method provides a value of the seismic velocity, V, for the interval which can be used in equation (8) to determine the porosity.

In order to determine equivalent salinity from values of groundwater resistivity, $\rho_w$, given by equation (5), it is necessary to estimate temperature.

The assumption that constant planar heat flow is occurring through the $n$ layers above the geothermal heat source leads to the equation (12) which provides the temperature at the base of the nth layer in terms of the surface temperature, $T_s$, the heat flow Q, and in terms of the ratio of layer thickness to thermal conductivity, $\Delta Z_k / K$.

$$T_n = T_s + Q \sum_{k=1}^{n} \frac{\Delta Z_k}{K_k} \quad (12)$$

Elder (1965) uses equation (13) to estimate thermal conductivity $$K_k = (1-\phi) K_{ma} + \phi K_w. \quad 13.$$

In this equation $K_{ma}$ is the thermal conductivity of the rock matrix, $K_w$ is the thermal conductivity of water saturating the rock and $\phi$ is the porosity.

Wyllie et al (1956) suggested an equation of identical functional form relating interval time (i.e. the reciprocal of the compressional seismic velocity), $1/V_k = \Delta t_k$, to the matrix interval time $1/V_{ma} = \Delta t_{ma}$ and the saturating fluid interval time $1/V_w = \Delta t_w$.

$$\Delta t_k = (1-\phi)\Delta t_{ma} + \phi \Delta t_w \qquad (14)$$

where again $\phi$ is the porosity (see equation (8)). By solving for the common parameter $\phi$ in equation (13) and (14) and equating, a linear equation in thermal conductivity and interval time (reciprocal velocity) is obtained. This equation is $$K_k = \frac{K_w - K_{ma}}{\Delta t_w - \Delta t_{ma}}(\Delta t_k - \Delta t_{ma}) + K_{ma}. \qquad (15)$$

For quartz rich sediments the value of $K_{ma}$ is approximately $2.5 \times 10^{-3}$, while in pyroclastic deposits a value of $5.0 \times 10^{-3}$ is more appropriate. The proper value of $K_w$ is $1.4 \times 10^{-3}$. An appropriate value for $\Delta t_{ma}$ for sediments is $55.5 \times 10^{-6}$ and an appropriate value for pyroclastic matrix interval time is $45.4 \times 10^{-6}$. The value usually used for $\Delta t_w$ is $189 \times 10^{-6}$. On substitution of this value for $K_k$ equation (12) I obtain $$T_n = T_s + Q \sum_{k=1}^{n} \frac{\Delta Z_k}{\frac{K_w - K_{ma}}{\Delta t_w - \Delta t_{ma}}\left(\frac{1}{V_k} - \Delta t_{ma}\right) + K_{ma}} \qquad (16)$$

for the temperature at the base of the $n$th layer. The equivalent salinity at the base of the nth layer is obtained by inputing this value of $T_n$ and the value of $\rho_w$ for the nth layer into the computer which automatically solves equation (6).

The following is given as a specific example of a utilization of applicant's novel method. Table I provides resistivity and seismic velocity data obtained by the preferred method described above. Also included are values of porosity as deduced from the surface measured velocity values using equation (7) with a value of $1/c$ equal to 0.79.

The data Table I demonstrate one of the limitations of the applicant's method. The correlation upon which equation (5) is based is for water saturated compacted rock. The uppermost zone at location 1 is only partially saturated and only partially compacted. This is attested to by a value of bulk seismic velocity which has a value less than the velocity of sound in air. Under these conditions equations (5) and (8) cannot be used to estimate the porosity and pore fluid resistivity.

Considering the next two zones at location one, it is of interest to note that although their "best" bulk resistivities differ by approximately 30 percent their calculated pore fluid resistivities differ by less than 4 percent. This suggests that both zones possess pore fluids of a very similar nature. Below these zones a fourth zone is encountered in which the pore fluid is an order of magnitude less resistive than in the overlying layers. In this portion of the Imperial Valley it has been established that hypersaline brine exists at depth. The data for location one given in Table I clearly indicate that this brine reservoir begins at a depth of 2410 ft.

The data obtained at location one can be contrasted with those obtained at location two located approximately 30 miles from location one. The location two data indicate that the subsurface pore fluids are markedly different from those at location one. The nearly four fold relative increase in the pore fluid resistivity at depths of the order of 3,000 ft. indicates that this portion of the Imperial Valley is underlain by a different hydrologic regime than that encountered at location one. Temperature change alone would not be able to affect such a drastic change. For if the salinity of the pore fluid is 30,000 parts per million, an increase in pore fluid resistivity from 0.0311 ohm-meter to 0.119 ohm-meter can only be brought about by a decrease in temperature at depth of approximately 360°F. Since the geothermal gradient is approximately the same at the two locations, the most logical conclusion is that the salinity of the pore fluid is much higher at location one than at location two.

TABLE I

| Depth | Bulk Resistivity | Location One Bulk Velocity | Porosity Eq. (7) | Fluid Resistivity Eq. (8) |
|---|---|---|---|---|
| 0 – 10 ft. | 2.1 ohm-m | 840 ft./sec. | — | — |
| 10 – 610 ft. | 3.6 ohm-m | 5590 ft./sec. | (73) | .288 ohm-m |
| 610 – 2410 ft. | 4.7 ohm-m | 6420 ft./sec. | 58 | .277 ohm-m |
| 2410 – 5610 ft. | 1.6 ohm-m | 8900 ft./sec. | 30 | .0311 ohm-m |
| | | Location Two | | |
| 0 – 100 ft. | 2.7 ohm.m | 1500 ft./sec. | — | (1.41) ohm-m |
| 100 – 1600 ft. | 7.4 ohm.m | 6070 ft./sec. | 64 | .496 ohm-m |
| 1600 – 3300 ft. | 3.2 ohm.m | 7580 ft./sec. | 43 | .119 ohm-m |

Consider first location one. The seismic data indicate that in this part of the Imperial Valley of California the subsurface to a depth of 5610 ft. can be subdivided into four zones. The seismic velocity for all subsurface zones was determined by equation (1) and is listed in the table. The resistivity values for all zones were determined by varying the resistivity within each zone until a "best" fit, in the least squares sense to the field data was obtained. These "best" values are listed in the table.

Firm information regarding the geothermal gradient allows prediction of the equivalent salinity of the pore fluid. Such information is obtainable by the use of equation (16). Many tables and equations such as equation (6) are available to convert to equivalent salinity when the resistivity and temperature of the pore fluid are known. On assuming that surface temperature and heat flow data lead to a temperature of 150° C (or 300° F) at 3,000 ft., the pore fluid resistivity data of Table I lead to an equivalent salinity at location one of approximately 60,000 parts per million whereas at location two a value of 12,800 parts per million is predicted. Such predictions are of prime importance when systems are being designed to extract useful energy from superheated brines. The above predictions are consistent with present knowledge of the hydrologic differences that exist between locations one and two.

The functioning of applicant's invention can be summarized with reference to FIG. 9 which shows in block diagram form the physical process involved, with reference to FIG. 11 which depicts a possible pilot-voltage source and with reference to FIG. 12 which further clarifies the method of received signal processing.

Pilot-voltage source 41 causes an electromagnetic and seismic disturbance to be created simultaneously within the earth by seismic wave and electrical current source 19. The pilot-voltage source 41 can consist of any electrical means capable of delivering energy sufficient to cause the production by seismic wave and electrical current source 19 of seismic waves and induced voltages having amplitudes sufficient to allow their remote detection. Such pilot-voltage sources can range from simple mechanically modulated voltage and current sources utilizing commutators and cams to sophisticated triggerable electronic function generators wherein the desired values of voltage and current as a function of time are stored in digital form and are producible sequentially on demand.

The functioning of the pilot-voltage source can perhaps best be envisioned with reference to the use of a voltage produced from an analogue magnetic tape. In practice however, a digital or FM tape may be required due to the possible necessity of producing frequencies presently below the range of analogue tape systems. FIG. 10 shows diagramatically such a pilot-voltage source. Magnetic tape 60 is being "read" by tape head 61 the output of which is amplified by power amplifier 62. The output of the pilot voltage source is transmitted by means of wires 86 and 87.

In areas where penetration of the electromagnetic disturbance is adversely affected by the skin effect the time base of the electromagnetic disturbance produced by 19 is translated by time base translator 43 so as to create lower frequencies. This translator is shown in block form in FIG. 9 and can take on forms similar to the pilot voltage source and is simply a means of monitoring in real-time the pilot voltage and reproducing in real-time the form of the pilot voltage wherein all frequencies have been reduced by a constant factor. In FIG. 9 the processing of only one output pair from only one combined seismic wave and earth potential receiver, 20, is diagrammed. In FIG. 12, the processing of only one of the two signals available from each receiver is diagrammed. It should be noted however that the seismic and earth potential correlograms for all receivers as shown in FIG. 8 must be provided to computer 44 to affect the solutions plotted in printout 45.

In FIG. 8 the earth potential voltages, $\nu_1$, $\nu_2$, $\nu_3$, $\nu_4$, and the seismic signal voltages, $S_1$, $S_2$, $S_3$, $S_4$, measured by the combined seismic wave and earth voltage receivers, 20, are indicated by time histories 31, 31', 31'', 31''' and 32, 32', 32'', 32''' respectively. These received time histories are cross-correlated with pilot voltage time history 30 in cross-correlator 47 depicted in block form in FIG. 9 to produce earth potential correlograms 33, 33', 33'', 33''' and seismic signal correlograms 34, 34', 34'', 34'''. This cross-correlation process is shown schematically in FIG. 12 and can be written analytically as $$\Phi_{pr}(\tau) = \frac{1}{T}\int_0^T r(t)\, p\,(t-\tau)\, dt \qquad (17)$$

where $p(t)$ is pilot voltage 30 and $r(t)$ represents the received seismic or earth potential signals.

The cross-correlation process can be accomplished in many ways of which the most easily visualized is an analogue solution as depicted in FIG. 12 in which cross-correlator 47 consists of a delay drum 63 and a multiplier-integrator circuit and readout device 64. The dimensions of the correlograms, $\Phi_{pr}(\tau)$ versus $\tau$, are simply related to those of the pilot voltage, and the maxima of the correlograms so produced correspond to events in the remotely detected seismic signal or earth potential voltages. That is, the amplitude of the maxima in the correlogram are proportional to the product of the amplitudes of events of common frequency between the pilot voltage and received signal and the times $t_n$ of the maxima on the correlogram correspond to the times of arrival of the returned complex input wave form in the remotely measured voltages. There are many ways to extract from the correlograms the values of earth potential difference to injected current ratio $\Delta\nu/I$ required for solution. It will be recalled that the pilot voltage is proportional to the injected current I therefore the maxima value of correlogram 33 will be $(BI\nu_1)/2$ where $\nu_1$ is relative to arbitrary earth potential $\nu_o$ and where B is the constant of proportionality between the pilot voltage and the injected current. If the pilot voltage is cross-correlated with itself the value of the maximum value of the resulting auto-correlogram is $B^2I^2/2$. Division of cross-correlogram 33 by the auto-correlogram of the pilot voltage results is a function whose maximum value is $\nu_1/BI$. By operating on 33' in the same way $\nu_1/BI$ is obtained. Subtraction of these two functions leads to a function with a maximum value $(\nu_1 - \nu_2)/BI$ which when multiplied by the factor of proportionality B between the pilot voltage and the injected current leads to a function having maximum amplitude equal to $(\nu_1 - \nu_2)/I$ or $\Delta\nu_{1,2}/I$. The potential difference current ratio for all other sets $(\nu_n - \nu_{n+1})/I$ are obtained in a similar manner. These ratios when processed by means of equation (2) and divided by the value $\rho_1$ obtained at small $x$ result in the basic data 68 to which theoretical curves such as 18 of FIG. 2 are automatically fit.

In the analogue process shown in FIG. 12 the process of obtaining the correlogram is one in which the delay drum rotating at angular frequency $\omega$ is incrementally adjusted through values of $\tau = 0$ to $\tau = T$, where T is the greatest time length of interest by adjusting the position of tape heads 65 and 65'. T should at least be equal to the two-way travel time of the deepest seismic reflection plus the time required to generate the pilot voltage.

Cross-correlation works equally well on earth potential voltages produced by current derived from a pilot voltage that has undergone time base expansion if said measured earth potential voltages are subjected to time base compression prior to cross-correlation, such compression being of such magnitude that the resultant earth potential time history has the same time base as the pilot voltage. For the case diagrammed in FIG. 9 no time base translation is occurring as indicated by the position of switches 46.

The cross-correlator 47 provides computer 44 with the inputs shown as 33 and 34 in FIG. 8. The additional combined seismic wave and earth potential receivers provide input pairs (i.e. 33' 34', 33'' 34'', 33''' 34''', etc.) obtained at larger values of $x$.

While certain preferred embodiments of the invention have been specifically disclosed, it is understood that the invention is not limited thereto, as many variations will be readily apparent to those skilled in the art, and the invention is to be given its broadest possible interpretation within the terms of the following claims.

What is claimed as new and useful is:

1. A method for locating and characterizing subterranean layers comprising the steps of:
   a. detecting at several locations on the earth's surface a first set of outputs which are proportional to the amplitudes of the reflected seismic waves generated by a combined seismic wave and electrical current source while simultaneously detecting at the same locations a second set of outputs proportional to the voltage induced in the ground by the current produced at the seismic wave and electrical current source, and while simultaneously recording the pilot voltage used to generate the seismic and electrical current pulses, at the combined source, said pilot voltage being identical in form and proportional to both the source's seismic pulse and the source's electrical pulse;
   b. processing in a multi channel cross-correlator the pilot voltage and the first and second set of outputs using the pilot voltage as the noise free reference signal, so as to obtain accurate values for the seismic wave arrival times, the amplitudes of these seismic arrivals and accurate values of the induced voltages and the relative time delays of these voltages;
   c. computer processing the outputs of the cross-correlator which contain the reflection arrival times to obtain the seismic velocity $V_n$ for all layers by automatically solving the equation $$V_n = \left\{ \frac{x^2}{2[t_n(0) - t_{n-1}(0)]} \left( \frac{1}{\Delta t_n} - \frac{1}{\Delta t_{n-1}} \right) \right\}^{1/2}$$

in which $t_n(0)$ and $t_{n-1}(0)$ are respectively the arrival time at $x = 0$ from the bottom and top of the $n$th layer and in which $\Delta t_n$ and $\Delta t_{n-1}$ are respectively the difference in arrival time between $x=0$ and $x=x$ for the reflection from the bottom and the top of the $n$th layer, the variable $x$ in said equation being known and input to the computer;
   d. computer processing of the outputs of the cross-correlator which contain the induced voltage values to obtain for all layers the value of bulk rock resistivity, $\rho_r$, determined from the $n$-layer equivalent of the half space solution $$\rho_a = \frac{2\pi \Delta \nu}{1 \left( \frac{1}{x_n} - \frac{1}{x_{n+1}} \right)}$$

in which $\Delta \nu$ is the potential difference created by the injection of current I as measured between electrodes located at distances $x_n$ and $x_{n+1}$ from the surface current pole, said values of $\rho_r$ being those which best bring into accord in the least squares sense the seismically determined sequence of layers, $\Sigma h_n$, given by $$\sum_{n=0}^{N} h_n = \sum_{n=0}^{N} V_n (t_n(o) - t_{n-1}(0))$$

where the quantities are those defined in step c, and the measured induced voltage values, this accord being brought about by the fact that there is only one sequence of $\rho_r$ values possible for the measured induced voltages once the sequence of thicknesses has been seismically established;
   e. computer processing the values of layer resistivity, $\rho_r$, in conjunction with values of layer seismic velocity, V, to determine the pore fluid resitivity, $\rho_w$, through solution of the relation $$\rho_w = \frac{\rho_r}{a} \left( \frac{1}{V} - b \right)$$

in which $a$ and $b$ are constants determined for the area undergoing exploration.

2. The method of claim 1 in which step (a) comprises detecting at several locations on the earth's surface as a first set of output functions of time the amplitudes of reflected seismic waves generated by a remote combined seismic wave and electrical current source while simultaneously detecting as a second set of output functions of time the voltage induced at various distances by an electrical current waveform which differs from the source's seismic waveform only in terms of its time base, and while detecting and storing as a third output function of time the pilot voltage which is identical in form and proportional to the seismic pulse produced by the source and which differs from the source's current waveform only in terms of its time base; and in which step (6) of claim 11 comprises generating a fourth set of functions of time by altering the time base of the second set of functions of time until the frequencies present in the voltage induced by the current source are identical with those contained in the third function of time and correlating as described in step (b) of claim (11) the third function of time with the first and fourth set of functions in such a way as to obtain accurate values of the seismic wave arrival times and the amplitudes of these arrivals and accurate values of the voltages and the relative time delays of these induced voltages.

3. The method of claim 1 where in values of pore fluid resistivity are used in conjunction with values of equivalent salinity, obtained from bore hole samples, to determine by means of the equation presented in claim 5 the temperature of the fluid saturating each layer.

4. The method of claim 1 wherein values of pore fluid resistivity obtained are used in conjunction with temperature values determined from surface temperature, $T_s$, heat flow, Q, and seismic velocity, $V_k$, values using the relation $$T_n = T_s + Q \sum_{k=1}^{n} \frac{\Delta Z_k}{\frac{K_w - K_{ma}}{\Delta t_w - \Delta t_{ma}} \left( \frac{1}{V_k} - \Delta t_{ma} \right) + K_{ma}}$$

in which $\Delta Z_k$ is the thickness of the layer having seismic velocity $V_k$, and in which $K_w$ and $K_{ma}$ are respectively the thermal conductivity of the fluid phase and rock matrix respectively, and in which $\Delta t_w$ and $\Delta t_{ma}$ are respectively the interval time for the fluid phase and rock matrix, to determine the equivalent salinity of the fluids saturating all layers through solution of the equation $$C = \frac{10M}{\beta \rho_w (u_{a_{1x}} - u_{c_{1x}})(1 + \alpha(T-18))}$$

in which $M$ is the molecular weight of the dissociated salt, $\beta$ is its degree of dissociation, $u_{a_{1x}}$ and $u_{c_{1x}}$ are the ionic mobilities at 18° C for the anions and cations respectively, $\alpha$ is a coefficient which takes on the value 0.025 for most electrolytes, $T$ is temperature in degrees Centigrade, and $\rho_w$ is the pore fluid resistivity in ohm-meters.

5. The method of claim 1 wherein the values of layer resistivity $\rho_r$ and layer pore fluid resistivity $\rho_w$ are used to compute the porosity, $\phi$, for each layer through solution of the relation $$\rho_r = k \rho_w \phi^{-m}$$

in which $k$ and $m$ are constants for the area undergoing exploration.

6. The method of claim 1 wherein the values of layer seismic velocity, V, obtained are used to compute the porosities of the individual layers or zones by use of the relation $$\phi = \frac{1/V - 1/V_{ma}}{1/V_w - 1/V_{ma}} \cdot \frac{1}{c}$$

in which $\phi$ is the porosity, $V_w$ and $V_{ma}$ are respectively the seismic velocity in the fluid phase and in the solid matrix phase and in which $c$ is a correction factor to be applied in areas of under-compaction.

7. The method of claim 1 in which the receive transducers consist of a seismometer and potential measuring electrode housed in a common container.

8. The method of claim 1 in which the seismic energy source and the electrical current source are housed in a common container.

9. The method of claim 1 in which the amplitude and sign of reflected arrivals are used to verify the distribution of velocity as a function of distance in accordance with the equation $$\frac{A_r}{A_i} = \frac{d_n V_n - d_{n-1} V_{n-1}}{d_n V_n + d_{n-1} V_{n-1}}$$

where $d_{n-1} V_{n-1}$ is the acoustic impedance on the side of the boundary nearest the source and $d_n V_n$ is the acoustic impedance on the far side of the boundary and where $A_r$ is the amplitude of the reflected seismic wave and $A_i$ is the amplitude of the incident seismic wave.

* * * * *

UNITED STATES PATENT OFFICE
CERTIFICATE OF CORRECTION

Patent No. 3,975,674      Dated Aug. 17, 1976

Inventor(s) Robert B. McEuen

It is certified that error appears in the above-identified patent and that said Letters Patent are hereby corrected as shown below:

Figure 12, right-hand 65 should be changed to 65'.

Column 2 Line 13, $1(\frac{1}{x_n} - \frac{1}{x_{n+1}})$ should be changed to $I(\frac{1}{x_n} - \frac{1}{x_{n+1}})$.

(Similar errors appear in the Specification at Column 3 Line 34 and Column 13 Line 63).

Column 2 Line 19, $\rho_\ell$ should be changed to $\rho_1$ in both cases.

Column 3 Line 7, $t_{n\ 1}$ should be changed to $t_{n-1}$ in both cases.

Column 3 Line 25, $\rho_a \rho_\ell$ should be changed to $\rho_a/\rho_1$.

Column 3 Line 26, $(x_n+x_{n+\ell}14$ should be changed to $(x_n+x_{n+1})/4$.

Column 3 Line 26, $x_{n+\ell}-x_n$ should be changed to $x_{n+1}-x_n$.

Column 3 Lines 36, 40, 43, and 45, $\rho_\ell$ should be changed to $\rho_1$.

Column 4 Lines 5 and 6, $d_{n\ 1}V_{n\ 1}$ should be changed to $d_{n-1}V_{n-1}$.

Column 4 Line 7, $d_{n-\ell}V_{n-\ell}$ should be changed to $d_{n-1}V_{n-1}$.

Column 7 Line 31, $u_2$ should be changed to $u_a$.

Column 7 Line 35, $u_9$ should be changed to $u_a$.

Column 11 Line 36, Fig. 10 should be changed to Fig. 11.

Column 12 Line 28, $\Delta V/1$ should be changed to $\Delta V/I$.

Column 12 Line 40, $V_1/BI$ should be changed to $V_2/BI$.

Column 14 Line 5, $t_{n\ 1}$ should be changed to $t_{n-1}$.

Column 14 Line 39, step (6) should read step (b) and claim 11 should read claim 1.

Column 14 Line 45, claim (11) should read claim (1).

UNITED STATES PATENT AND TRADEMARK OFFICE
CERTIFICATE OF CORRECTION

PATENT NO. : 3,975,674
DATED : August 17, 1976
INVENTOR(S) : Robert B. McEuen

It is certified that error appears in the above-identified patent and that said Letters Patent is hereby corrected as shown below:

Column 14 line 55, claim 5 should read claim 4.

Signed and Sealed this

Seventh Day of June 1983

[SEAL]

Attest:

DONALD J. QUIGG

Attesting Officer

Acting Commissioner of Patents and Trademarks